Figure 1:
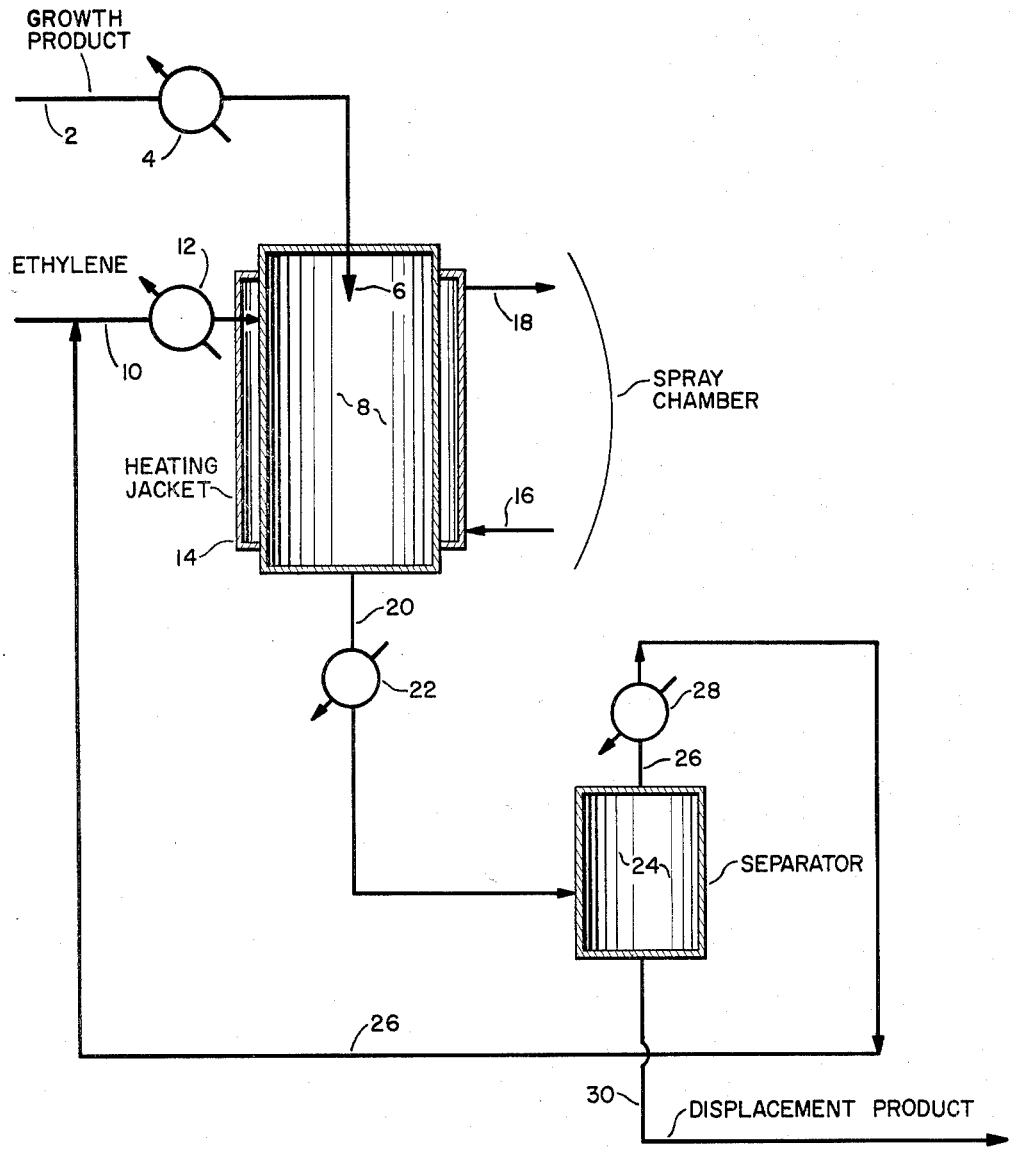

INVENTORS.
EUGENE F. KENNEDY
JIMMIE R. BOWDEN
JERRY A. ACCIARRI

3,210,435
PREPARATION OF OLEFINS
Eugene F. Kennedy and Jerry A. Acciarri, Ponca City, Okla., and Jimmie R. Bowden, Needham Heights, Mass., assignors to Continental Oil Company, Ponca City, Okla., a corporation of Delaware
Filed Nov. 21, 1960, Ser. No. 70,771
9 Claims. (Cl. 260—677)

This invention relates to a process for the preparation of olefins. In one aspect, it relates to a process for the selective displacement of olefins from aluminum alkyl growth product.

One method for the preparation of olefins, particularly olefins of increased molecular weight, involves the reaction of an alkyl aluminum compound such as aluminum triethyl with a low molecular weight olefin, for example, ethylene, to form an aluminum alkyl "growth" product in which the alkyl groups can contain a wide range of carbon atoms. After its formation, the growth product is heated in the presence of an additional quantity of olefin and a finely divided metal catalyst, such as finely divided nickel, whereby the low molecular weight olefin reacts with the growth product to displace higher olefins. Finally, the higher olefins are recovered from the reaction mass.

While the nickel catalyst is effective in promoting displacement, it has been found that this catalyst has certain disadvantages in that it is difficultly removable from the aluminum alkyl in the reaction mass. Since the aluminum alkyl is ordinarily reused in the growth processes, the presence of even small amounts of nickel therein can be detrimental to the growth reaction.

Displacement in the absence of a catalyst is also known and has been suggested; however, ordinarily, the non-catalytic displacement requires elevated temperatures and has the disadvantage of producing substantial quantities of internal and branched olefins rather than the straight-chain homologues of ethylene which are particularly desired as product. The disadvantages of thermal displacement as known in the art are discussed in U.S. Patent No. 2,781,410, Ziegler et al., wherein the use of nickel catalyst is advanced in preference to thermal displacement.

It is an object of this invention to provide an improved process for the preparation of olefins.

Another object of this invention is to provide an improved noncatalytic process for the thermal displacement of olefins from aluminum alkyls.

Still another object of this invention is to provide a process for improving selectivity in the preparation of olefin mixtures.

Yet another object of this invention is to provide a process for improving selectivity in the preparation of olefins by thermal displacement from aluminum alkyl growth product.

These and other objects of the invention will become more readily apparent from the following detailed description and discussion.

The foregoing objects are achieved broadly by reacting aluminum alkyls in the atomized state under controlled conditions of temperature, pressure, and reaction time in the absence of a catalyst and recovering as product olefins displaced from said aluminum alkyls.

The process of this invention finds application broadly in the treatment of aluminum alkyls, either individually or in admixture. The invention is particularly applicable, however, to the treatment of aluminum alkyls prepared by the reaction of an alkyl aluminum compound, such as aluminum triethyl, with a low molecular weight mono-1-olefin, such as ethylene. This reaction can be illustrated equationwise as follows:

(1)
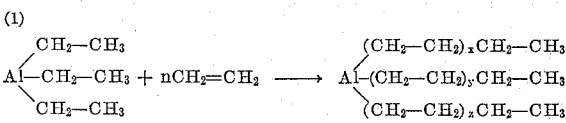

wherein $x$, $y$, and $z$ represent integers ranging from 0–14 (average 3–7) and $x+y+z=n$.

The foregoing reaction is carried out by passing ethylene through triethylaluminum, preferably in the presence of a diluent under a wide variety of reaction conditions, e.g., 65°–150° C. and 200–5,000 p.s.i.g., preferably 90°–120° C., and 1,000–3,500 p.s.i.g. It is to be understood that, instead of employing triethylaluminum as the starting trialkylaluminum in the above reaction, other low molecular weight alkyl ($C_2$–$C_4$) aluminum compounds, such as tripropylaluminum, tributylaluminum, triisobutylaluminum, diethylaluminum hydride, ethylaluminum dihydride, etc., can be employed; and in lieu of ethylene, other low molecular weight aliphatic mono-1-olefins, such as propylene, butene, and the like may be substituted. Generally, $C_2$–$C_4$ olefins are preferred as the growth hydrocarbon compound.

The growth reaction is ordinarily carried out in a diluent, which can be a paraffin, cycloparaffin, or aromatic hydrocarbon, for example, isooctane, cyclohexane, benzene, xylene, and the like. The diluent aids in controlling the temperature of the growth reaction which is exothermic and also acts as a solvent for the growth product. The growth product is ordinarily processed in accordance with the method of this invention with diluent present; however removal of the diluent can be carried out beforehand if desired.

In carrying out the invention in a preferred embodiment thereof, aluminum alkyl growth product in which the alkyl groups contain from about 2 to about 30 carbon atoms is finely subdivided, that is, atomized and thereafter reacted with a low molecular weight mono-1-olefin, such as ethylene, whereby the ethylene displaces olefins of varying molecular weight to provide a product comprising said olefins and low molecular weight aluminum alkyl. Again ethylene is preferred; however other low molecular weight mono-1-olefins, such as propylene, butenes, and the like can be used. The foregoing reaction is carried out at temperatures below about 700° F., for example, between about 100° and about 700° F. and preferably between about 400 and about 550° F. The reaction pressure is maintained below about 200 p.s.i.a. and can be below atmospheric, for example, as low as about 1 p.s.i.a. Preferably the pressure varies between about 20 and about 100 p.s.i.a. The reaction can be carried out over a relatively extended period of time, varying from about 30 seconds to about 15 minutes, usually from about 1 minute to about 10 minutes and preferably from about 3 minutes to about 7 minutes.

Any of the conventional spray or atomizing nozzles can be provided for the purpose of subdividing the aluminum alkyls prior to carrying out the displacement reaction. For example, conventional hollow cone nozzles can be employed wherein atomization is provided by pressure differential across the nozzle. Other types of nozzles can be employed wherein subdivision of the aluminum alkyl is aided by employing an atomizing gas which, if used, is preferably a portion of the ethylene employed in the displacement reaction. Atomization of the aluminum alkyls is aided by elevated temperatures which reduce their viscosity. In general, the aluminum alkyls are heated prior to atomization to a temperature below the reaction temperatures, for example, up to about 650° F.; however, preferably, sufficient heating is carried out to provide a preatomization temperature of about 190 and 320° F.

The low molecular weight olefin, for example, ethylene, is employed in the displacement reaction ordinarily in at least a stoichiometric amount and can be used in amounts sufficient to provide an excess of this reactant based on the aluminum alkyls up to about 3,000 percent, that is, up to about 30 moles of the olefin per alkyl group present in the aluminum alkyls. More usually, the olefin is provided in an excess based on the aluminum alkyls of about 200 to about 1,000 mole percent. To aid in maintaining the desired temperatures in the reaction zone, the olefin is preferably preheated prior to introduction thereto, for example, to a temperature up to the reaction temperature, and preferably to between about 230 and 550° F.

The reaction product comprises a mixture of aluminum alkyls which include aluminum alkyls formed during the displacement reaction and also unconverted or partially converted aluminum alkyls and a variety of olefins containing from 2 to about 30 carbon atoms. It has been found that the method of this invention provides a selective displacement in that the lower molecular weight olefins are preferentially displaced over the higher molecular weight olefins. Ordinarily, at least a portion of the higher molecular weight olefins are displaced; however the percentages of the lower molecular weight olefins displaced, for example, the $C_4$ to $C_8$ olefins, vary from about 60 to about 100 percent as compared to only about 10 to about 40 percent for the $C_{16}$ to $C_{20}$ olefins. It has also been found that, in the methods of this invention, the percentage of olefins displaced of each carbon content varies substantially as a straight line function when plotted on semilog paper. This unexpected feature of selectivity results generally over the ranges of temperature, pressure, reaction time, reactant ratios, and preheat temperatures hereinbefore set forth.

The amount of conversion obtained, that is, the proportion of aluminum alkyls which are reacted varies, depending on the particular reaction conditions, the highest conversions being obtained with increased rations of olefin to growth product, elevated preheat temperatures, and moderate reaction pressures. More usually, moderate reaction time is preferred, since with extended reaction times there is a tendency for the displacement reaction to produce increasing amounts of internal and branched olefins.

Atomization of the growth product is an important feature of the invention. It is well known that when aluminum alkyl growth product is subjected to elevated temperatures, such as are employed herein, for any appreciable time, the result is not displacement but rather continued and accelerated growth reaction. It is entirely unexpected that the reaction conditions employed in carrying out this invention could be used effectively for carrying out the displacement reaction.

The higher olefins which are produced in the method of this invention find particular utility in the production of detergents, and the lower olefins can be used as plasticizers and feed materials in various polymerization processes. In view of the selective displacement of lower molecular weight olefins, it is possible to recycle undisplaced growth product to the reaction system, thereby increasing the quantity of olefins in the higher molecular weight ranges, when so desired.

Figure 2:
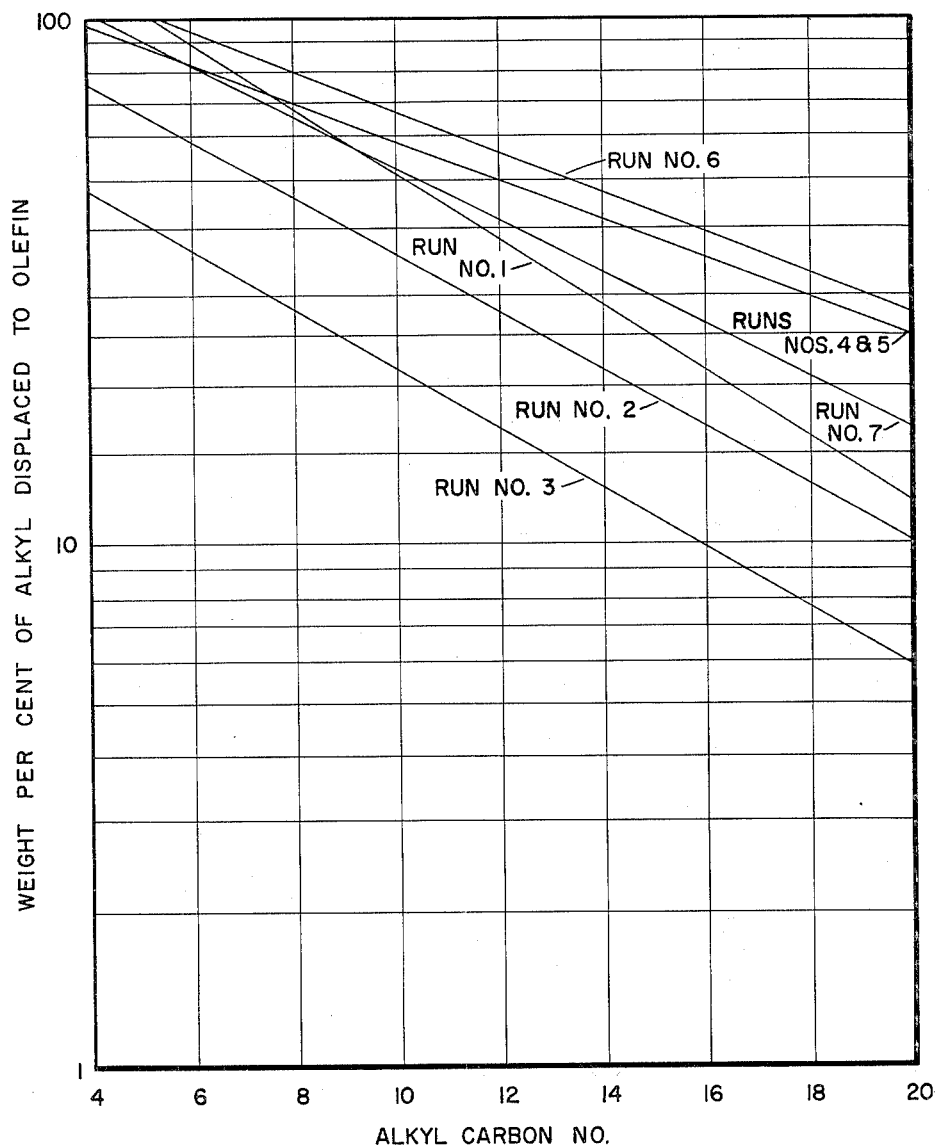

In order to more clearly describe the invention, reference is made to the accompanying drawings of which FIGURE 1 is a diagrammatic illustration of a system comprising a spray chamber in associated equipment suitable for carrying out the invention; and FIGURE 2, which is a graph illustrating the relationship between the carbon number of the displaced olefins and the percent of growth product of corresponding carbon number converted in the displacement reaction.

Referring to FIGURE 1, aluminum alkyl growth product, prepared by the reaction of aluminum triethyl with ethylene, is passed through conduit 2 and preheater 4 wherein the temperature is substantially increased and thereafter into spray chamber 8. Upon entering the spray chamber, the growth product is atomized nozzle 6. Concurrently, ethylene, preheated in exchanger 12, is introduced to the spray chamber through conduit 10. Within the spray chamber, the ethylene and growth product are brought in contact and reacted at elevated temperatures for a sufficient period of time to provide displacement of olefins from the growth product. The displacement reaction is endothermic, and control and maintenance of the reaction temperature are provided by a heating jacket 14, which surrounds the chamber. Reaction heat is provided by a heating fluid introduced to heating jacket 14 through conduit 16 and removed therefrom through conduit 18. The spray chamber can be any suitable type of vessel which provides a reaction space, whereby growth product and ethylene can be either cocurrently or countercurrently contacted to provide the desired displacement reaction. The heating jacket 14 is merely illustrative of one apparatus which can be employed for transmitting heat to the reaction system; and any other heat exchange means can be used. In addition, any conventional heating fluid such as steam, liquid salts, etc., can be employed in the heating means.

The product of the displacement reaction comprising a mixture of olefins of varying molecular weight, unreacted growth product, and aluminum triethyl are withdrawn from the spray chamber through conduit 20, cooled in exchanger 22 to liquefy condensable materials, and introduced to separator 24. A liquid stream comprising displaced olefins, aluminum triethyl, and unreacted growth product is withdrawn from the separator through conduit 30. This material can be further processed (not shown) to effect separation between these materials. As desired, aluminum triethyl from the precessed displacement product can be reused in the growth reaction. Also unreacted growth product can be recycled to the growth reaction to effect increased conversion to higher molecular weight growth product if desired. The higher molecular weight growth product can then, by means well known, be converted to high molecular weight alcohols.

Uncondensed material is withdrawn overhead from separator 24 through conduit 26 and passed into cooler 28 wherein additional cooling is provided to condense materials heavier than ethylene, the condensed components flowing back into separator 24. The non-condensed vapors are passed through conduit 26 joining the ethylene feed stream to the spray chamber prior to preheater 12.

The following data are presented in illustration of the invention.

EXAMPLE

A series of runs were carried out in which aluminum alkyl growth product was prepared by reacting a 50 weight percent aluminum triethyl-solvent mixture with ethylene at a temperature of 255° F., a pressure of 1,500 p.s.i.g. for 2.5 hours. The resulting growth product had a Poisson distribution of $m=4$.

The growth product as prepared above was atomized in a hollow-cone nozzle and reacted with ethylene to effect a displacement reaction. The conditions employed in the reaction and the products obtained are set forth in the following table:

Table

|  | Run No. 1[2] | Run No. 2[2] | Run No. 3[2] | Run No. 4[2] | Run No. 5[3] | Run No. 6[3] | Run No. 7[2] |
|---|---|---|---|---|---|---|---|
| Growth product: | | | | | | | |
| Feed rate, gallons per hour | 2.5 | 2.5 | 2.5 | 2.5 | 2.5 | 2.5 | 2.5 |
| Solvent | i-Octane | Mixed xylenes | i-Octane | Mixed xylenes | i-Octane | i-Octane | i-Octane |
| Solvent conc., weight percent | 16 | 21 | 16 | 21 | 16 | 16 | 16 |
| Ethylene feed rate, s. c. f. h | 144 | 144 | 191 | 191 | 191 | 191 | 356 |
| Temperature, °F.: | | | | | | | |
| Cold growth product | 70 | 70 | 70 | 70 | 70 | 70 | 70 |
| Cold ethylene | 68 | 68 | 68 | 68 | 68 | 68 | 68 |
| Preheated growth product | 196 | 232 | 122 | 270 | 315 | 254 | 250 |
| Preheated ethylene | 246 | 230 | 550 | 510 | 510 | 325 | 370 |
| Heat exchange fluid | 488 | 480 | 500 | 515 | 490 | 480 | 475 |
| Spray chamber | 433 | 420 | 470 | 472 | [1] 460–528 | [1] 440–490 | 440 |
| Pressures, p.s.i.g.: | | | | | | | |
| Ethylene | 75 | 70 | 200 | 200 | 200 | 200 | 200 |
| Growth product | 150 | 95 | 150 | 215 | 100 | 220 | 110 |
| Spray chamber | 30 | 30 | 30 | 30 | 70 | 70 | 70 |
| Residence time: Minutes[4] | 6.3 | 6.4 | 4.6 | 4.5 | 8.3 | 8.7 | 4.8 |
| Composition of displacement product, weight percent of olefin displaced: | | | | | | | |
| $C_4$—Olefin | *100.0 | *80.0 | *50.0 | *98.0 | *99.0 | *100.0 | *99.0 |
| $C_6$—Olefin | *90.0 | 58.7 | *37.5 | 80.1 | *82.0 | *96.0 | *82.0 |
| $C_8$—Olefin | 67.6 | 46.7 | *28.6 | 74.5 | 71.3 | 78.7 | 65.7 |
| $C_{10}$—Olefin | 52.3 | 35.5 | 22.3 | 60.7 | 61.4 | 69.1 | 52.4 |
| $C_{12}$—Olefin | 38.3 | 27.7 | 16.2 | 44.2 | 49.5 | 56.4 | 41.9 |
| $C_{14}$—Olefin | 29.0 | *21.8 | 11.8 | *42.0 | 42.2 | 46.5 | 32.5 |
| $C_{16}$—Olefin | 21.5 | *17.0 | 10.2 | 35.7 | 35.6 | 41.0 | 24.7 |
| $C_{18}$—Olefin | 19.8 | *13.1 | 7.7 | *30.0 | 29.3 | 32.6 | 21.4 |
| $C_{20}$—Olefin | *12.1 | *10.2 | *5.9 | *25.5 | 23.0 | 28.2 | 17.1 |

[1] The temperature increased steadily during the run.
[2] A very small amount (less than 0.2 percent) of branched and internal olefins present in the displacement product as determined by infrared analysis.
[3] Approximately 10 percent branched and internal olefins present in displacement product as determined by infrared analysis.
[4] Based on ethylene gas flow.
*Extrapolated values from Figure 2.

The date presented in the table above relating to the composition of the displacement product were plotted and are presented in FIGURE 2.

Referring to the table and FIGURE 2, it is noted that the displacement product comprises, prefrrentially, low molecular weight olefins, that is, the weight percent of alkyl displaced to olefin is much higher in the case of the low molecular weight olefins. This is shown particularly in FIGURE 2 from which it is apparent that the relationship between the extent of conversion in the displacement reaction and the number of carbon atoms in the growth product alkyl groups is a linear relation on semilog paper, and substantially favors displacement of lower molecular weight olefins. It is also noted from the table and FIGURE 2 that the total conversion, that is, the total amount of growth product which is displaced, varies depending on the reaction conditions employed, with maximum displacement occurring in Run No. 6 and the minimum displacement in Run No. 3. An examination of the data indicates that increased total conversion is favored by increased ratios of ethylene to growth product, increased preheat temperatures of both growth product and ethylene, and increased reaction pressures. It is also noted from the date that displacement is carried out over substantial periods of time without the formation of appreciable quantities of branched and internal olefins.

Having thus described the invention by providing a specific example thereof, it is to be understood that no undue limitations or restrictions are to be drawn by reason thereof and that many variations and modifications are within the scope of the invention.

We claim:

1. A noncatalytic process for the selective thermal displacement of olefins from aluminum alkyl growth product prepared by reacting ethylene with an aluminum alkyl having from 2 to 4 carbon atoms which comprises introducing said growth product to a reaction zone in an atomized state, therein reacting said growth product with a low molecular weight mono-1-olefin having from 2 to 4 carbon atoms at a temperature between about 100° F. and about 700° F. and a pressure between about 1 and about 200 p.s.i.a. for a residence time of at least about 30 seconds, and recovering as product olefins displaced from said aluminum alkyls.

2. The process of claim 1 in which the molar excess of low molecular weight mono-1-olefin to aluminum alkyls is from about 0 to about 3,000 percent.

3. The process of claim 2 in which the low molecular weight mono-1-olefin is ethylene.

4. A noncatalytic process for the selective thermal displacement of olefins from aluminum alkyl growth product prepared by reacting aluminum triethyl with ethylene which comprises atomizing the growth product, introducing the atomized growth product to a reaction zone wherein said growth product is reacted with ethylene at a temperature between about 400° F. and about 550° F. and a pressure below between about 20 and about 100 p,s.i.a. for a residence time of from about 1 minute to about 10 minutes, and recovering as product olefins displaced from said aluminum alkyls.

5. The process of claim 4 in which the reaction is carried out at a residence time of from about 3 to about 7 minutes.

6. A noncatalytic process for the selective displacement of olefins from aluminum alkyl growth product in which the alkyl groups vary from about 2 to about 30 carbon atoms prepared by reacting aluminum triethyl with ethylene, which comprises heating a solution of said growth product to a temperature between about 190° F. and about 320° F., atomizing the heated growth product, introducing the atomized growth product to a reaction zone wherein said growth product is reacted with ethylene present in a molar excess based on the growth product from about 0 to about 3,000 percent, at a temperature between about 400 and about 550° F. and a pressure between about 20 and about 100 p.s.i.a. for a residence time of from about 3 to about 7 minutes, and recovering as product olefins displaced from said aluminum alkyls.

7. The process of claim 6 in which the molar excess of ethylene is from about 200 to about 1000 percent.

8. The process of claim 6 in which the ethylene employed in the displacement reaction is preheated to a temperature between about 230 and about 550° F. prior to its introduction to the reaction zone.

9. The process of claim 6 in which the heated ethylene is employed to atomize the heated growth product.

References Cited by the Examiner

UNITED STATES PATENTS

| | | | |
|---|---|---|---|
| 2,695,327 | 11/54 | Ziegler et al. | 260—683.15 |
| 2,781,410 | 2/57 | Ziegler et al. | 260—683.15 |
| 2,863,896 | 7/56 | Johnson | 260—683.15 |
| 2,889,385 | 6/59 | Catterall et al. | 260—683.15 |
| 2,906,794 | 9/59 | Aldridge et al. | 260—683.15 |
| 3,017,438 | 1/62 | Atwood | 260—448 |
| 3,053,905 | 9/62 | Coyne et al. | 260—448 |
| 3,093,691 | 6/63 | McClaflin et al. | 260—448 |

OTHER REFERENCES

Weissberger: "Technique of Organic Chemistry," vol. III, pages 99–100, Interscience Publishers, Inc., New York, 1950.

ALPHONSO D. SULLIVAN, *Primary Examiner.*

ABRAHAM RIMENS, *Examiner.*